United States Patent [19]

Hilton

[11] Patent Number: 4,555,099

[45] Date of Patent: Nov. 26, 1985

[54] WORKBENCHES

[75] Inventor: Allan R. Hilton, Bolton, England

[73] Assignee: Hilton (Products) Limited, Bolton, England

[21] Appl. No.: 505,204

[22] Filed: Jun. 17, 1983

[51] Int. Cl.[4] .................................................. B23Q 3/02

[52] U.S. Cl. ....................................... 269/88; 269/208; 269/307; 269/900; 269/901; 269/244

[58] Field of Search ............... 269/900, 901, 307, 283, 269/208, 88, 244, 20, 21; 144/285, 286

[56] References Cited

U.S. PATENT DOCUMENTS

| | | | |
|---|---|---|---|
| 939,125 | 11/1909 | Fealy | 144/285 |
| 1,517,309 | 12/1924 | Morgan | 269/208 |
| 1,766,230 | 6/1930 | Sea | 269/208 |
| 3,779,539 | 12/1973 | Ziers | 269/307 |
| 4,157,819 | 6/1979 | Meyers | 269/900 |
| 4,170,345 | 10/1979 | Townsend | 269/88 |
| 4,199,135 | 4/1980 | Wohrle et al. | 269/901 |
| 4,278,243 | 7/1981 | Alessia | 269/901 |
| 4,415,149 | 11/1983 | Rees | 269/901 |

*Primary Examiner*—Robert C. Watson
*Attorney, Agent, or Firm*—Pravel, Gambrell, Hewitt & Kimball

[57] ABSTRACT

A workbench comprises a worktop supported by a collapsible leg arrangement, the worktop being adapted to support a vice comprising separate fixed and movable vice jaws. The worktop is formed with elongated slots at predetermined locations each adapted to receive a depending hook-like formation of a fixed vice jaw. The worktop also is formed at predetermined locations at its edge and extending inboard of the latter elongate recesses into each of which movable vice jaws can be located and secured by complementary formations at the inboard ends of the recesses and movable vice jaws. The separate fixed and movable vice jaws are secured in an operational working relationship by the worktop and such relationship can be varied.

8 Claims, 13 Drawing Figures

20A
22A
66A
61A
21A
65A
63A
57A
58A
59A
53A
70A
62A
67A
58A
53A
55A
54A
63A
54A
70A 20
52
46
42
21
68
66
22
65
63
57
58
59
61
62
70
67
69
53
55
54
24
23
28
25
26
48
50
63
70
53
54

67
62
53
61
70

23
23A
24
25
25A
26
26A
27
27A
28
28A
29
30
31
32
33
34
35
36
37
38

WORKBENCHES

This invention relates to a vice and a worktop particularly adapted for use with the vice.

The present invention is also concerned with a workbench incorporating the adapted worktop.

As is well known a vice generally comprises a fixed jaw and a movable or adjustable jaw between which can be gripped a workpiece, the fixed jaw being bolted or otherwise secured to a workbench with the movable jaw tied to the fixed jaw by guides such as rods and/or slides but movable towards or away from the fixed jaw by an adjusting screw.

With such conventional vice structure the vice is bodily immobilised in, or restricted to, a predetermined position on the workbench and is also restricted in its gripping capacity by its dimensions, i.e. its gripping width (transverse length of the jaws) and gripping length (spacing between the jaws).

It is an object of the present invention to provide a vice which obviates or mitigates the aforesaid restrictions and which has a substantially greater gripping capacity than a conventional vice.

According to the present invention, there is provided a vice comprising separate fixed and movable jaws between which a workpiece can be gripped, the jaws being adapted to be disposed in cooperating working relationship by being removably and adjustably located in predetermined positions on a worktop.

Also according to the present invention there is provided a worktop adapted to receive and locate separate fixed and movable vice jaws in spaced apertures in the worktop surface.

Preferably the worktop surface presents a multiplicity of apertures to permit separate and movable vice jaws to be located in different longitudinal and/or transversal working relationships.

The worktop is preferably supported, when in use, by a collapsible or foldable leg arrangement to provide a workbench.

The workbench may incorporate under the worktop and supported thereby and by the leg arrangement a shelf and saw block assembly.

An embodiment of the present invention will now be described, by way of example, with reference to the accompanying drawings, in which.

The workbench will be described mainly with reference to FIG. 1 and like parts in FIG. 2 will be indicated by the same reference numerals with the suffix "A".

Figures 1, 2, 3:
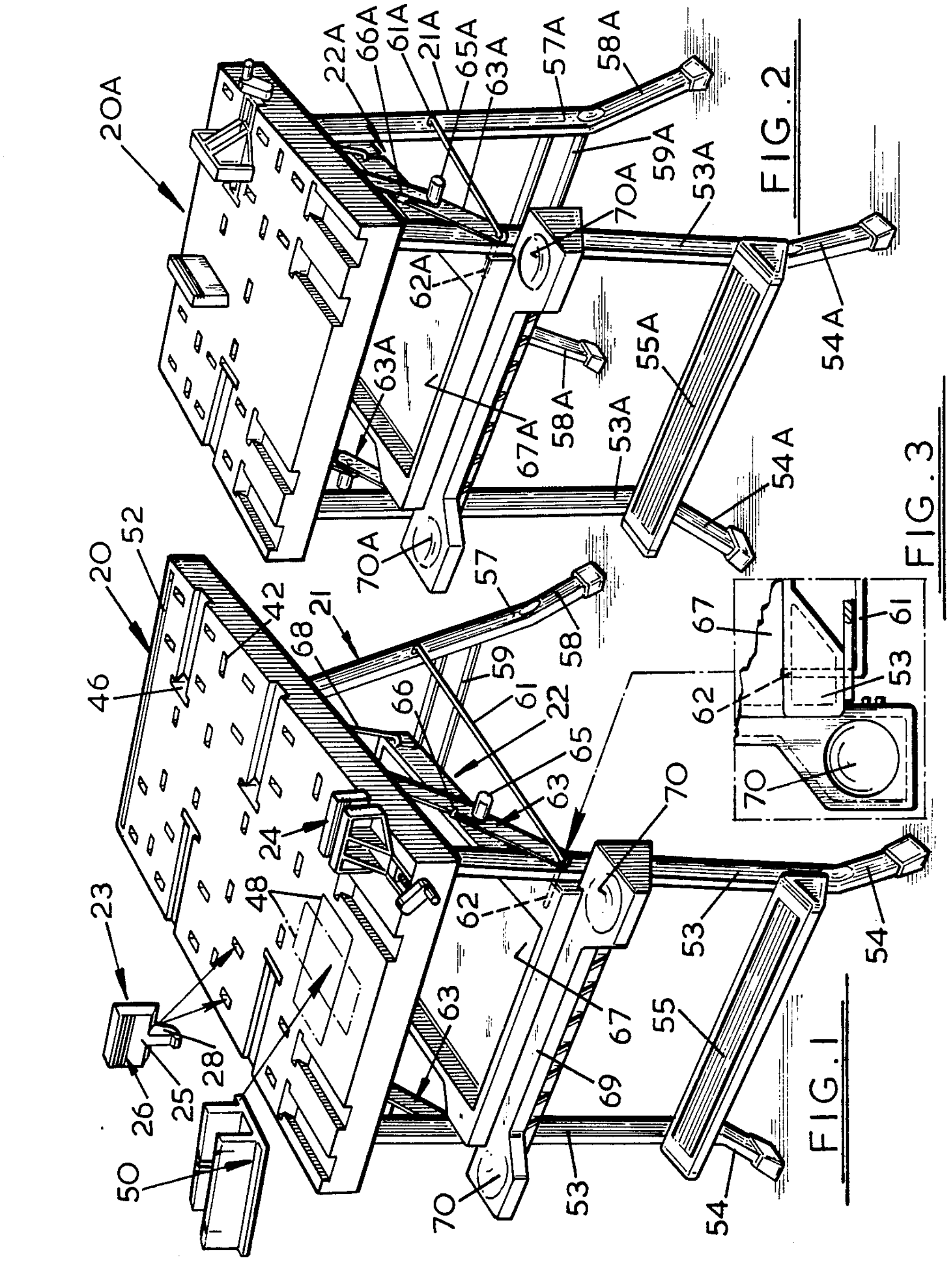
FIG. 1 is a perspective view of a workbench and vice combination according to the present invention.
FIG. 2 is a similar view of workbench and vice combination more suitable for do-it-yourself (DIY) purposes.
FIG. 3 is a detailed view of the aforesaid workbenches.
Figure 4:
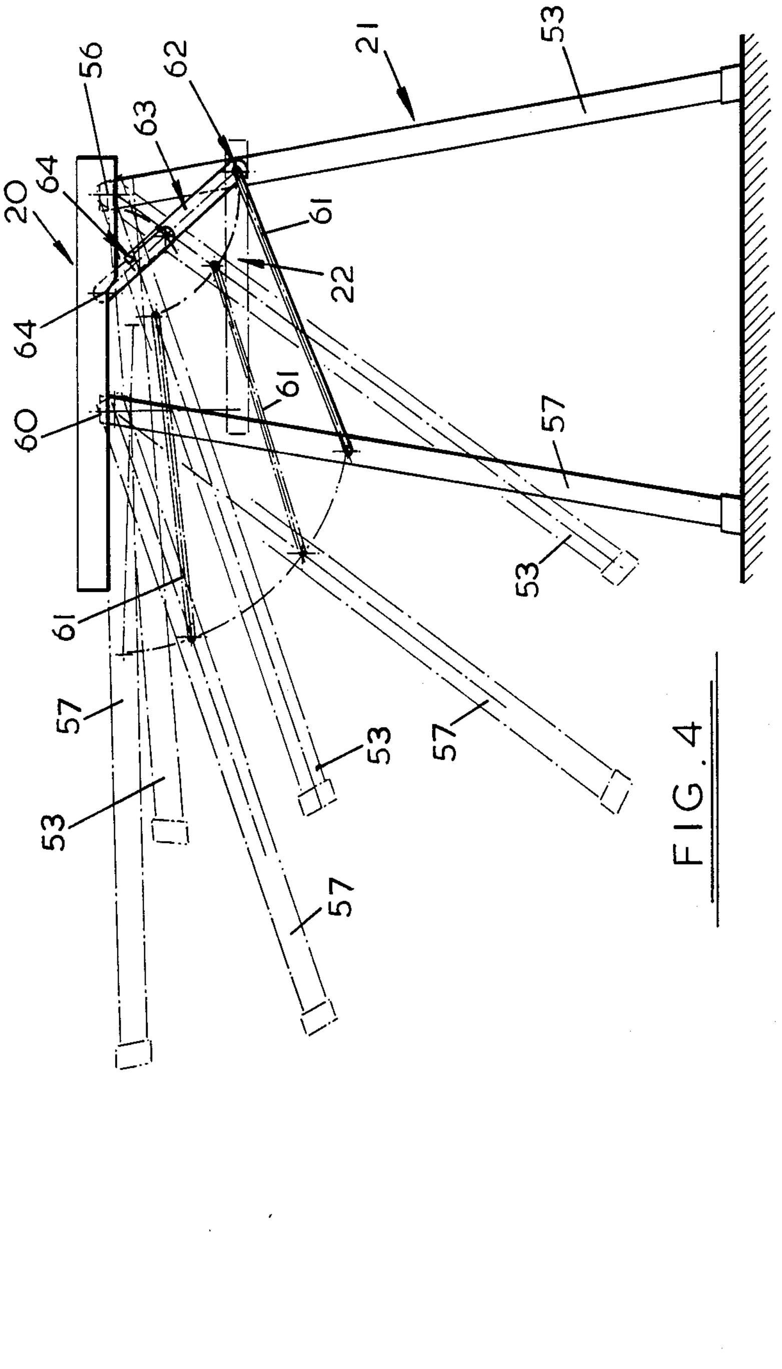
FIG. 4 is a diagrammatic side view of a workbench according to the invention in erect, partially collapsed or folded and collapsed or folded positions.
Figure 5:
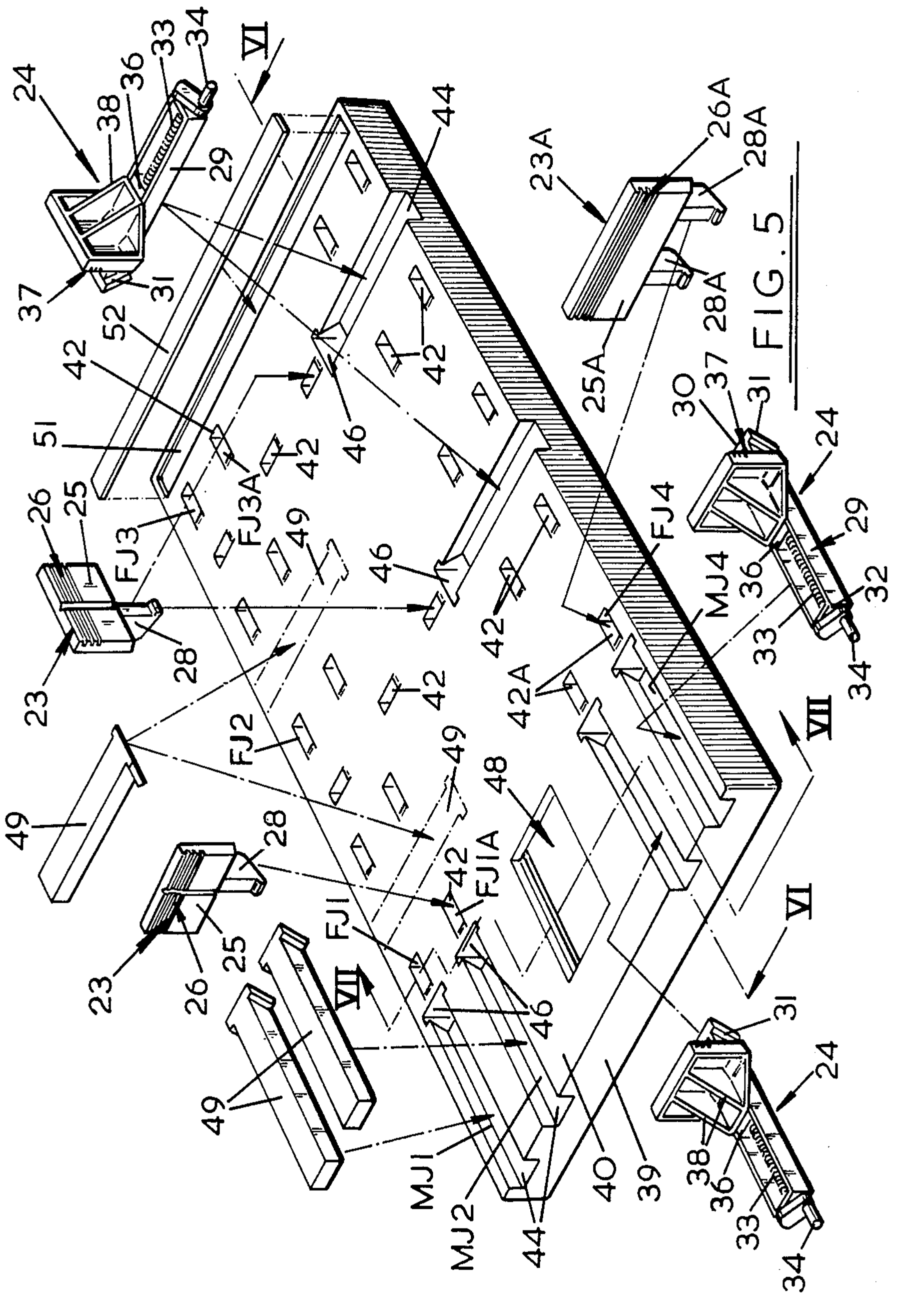
FIG. 5 is a perspective exploded view of the worktop and vice components of the workbench/vice combination of FIG. 1.

The workbench comprises a worktop 20 supported by a collapsible or foldable undercarriage or leg arrangement 21 which also supports a shelf/saw block assembly 22. The worktop 20 is designed to receive and locate a vice according to the invention.

The worktop 20 and shelf/saw block assembly 22 are formed of a rigid plastics material, for example of moulded polypropylene, while the undercarriage 21 is of metal construction.

The vice according to the present invention is distinguished by the fact that it consists of two completely separate units, namely a fixed jaw 23 and a movable or adjustable jaw 24, which are brought together in a cooperative working relationship by being removably and adjustably received in a selected two of a multiplicity of locations defined by the configuration of the worktop 20.

Reference will now be made to the vice with particular reference to FIGS. 9 to 13.

The fixed jaw 23 (FIGS. 10 and 11) is a single jaw, that is it has a workpiece gripping face of a length equal to or substantially so to the gripping face length of a movable jaw 24. The fixed jaw 23 is formed of aluminium although it may be moulded from a plastics material. It is of unitary construction and comprises a workpiece-gripping body 25 with a grooved configuration 26 along and adjacent its top edge, rearwardly-extending strengthening ribs 27 and a central depending hook-like formation 28 which serves to locate the fixed jaw 23 in the worktop 20 as will be later described.

Figures 9, 10, 11, 12, 13:
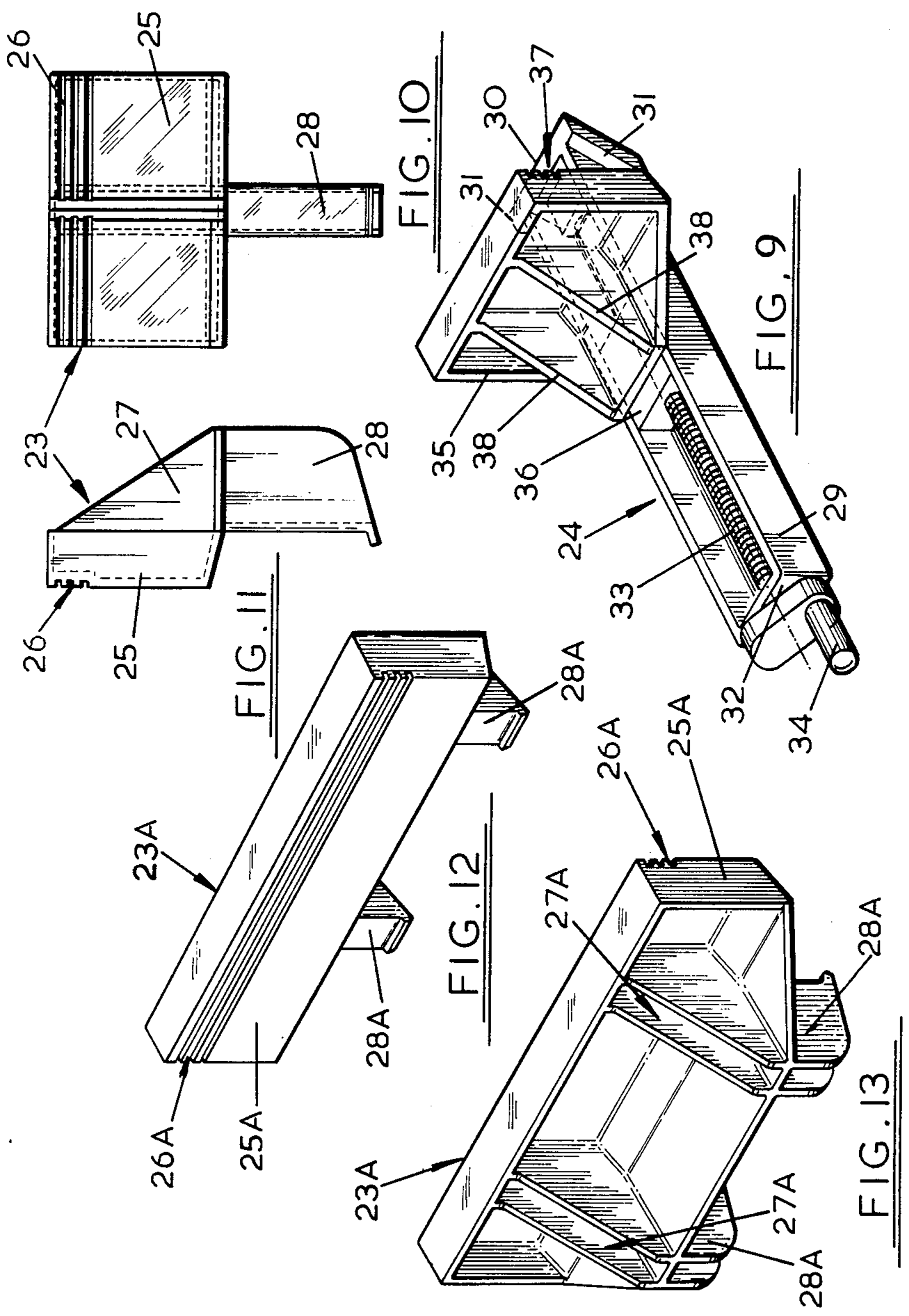
FIG. 9 is a perspective view of the movable jaw of the vice according to the invention.
FIGS. 10 and 11 are front and side elevations of a single fixed jaw of the vice according to the invention.
FIGS. 12 and 13 are front and rear perspective views of a double fixed jaw of the vice according to the invention.

FIGS. 12 and 13 illustrate a double fixed jaw 23A and parts similar to those of FIGS. 10 and 11 have the same references with the suffix "A". The difference between fixed jaws 23 and 23A is that the latter has a gripping face length equal at least twice that of the gripping face length of the movable jaw 24.

The movable jaw 24 (see in particular FIG. 9) comprises an elongate body 29 of aluminum by means of which it is located in the worktop 20 as will be described later. The body 29 is of channel configuration, open at its top and closed at both ends. The leading end of the body 29, i.e. the end which is inboard of the worktop edge when the movable jaw 24 is mounted on the latter, is closed by a wall 30 which is inclined downwardly and rearwardly and which has two lateral extensions 32. The rear end of the body 29 is closed by a vertical wall 32.

A steel screw 33 is rotatably disposed within the channel of the body 29, the screw ends being supported by the wall 30 and 32 and extending through the wall 32 to receive and mount an operating handle 34.

The movable jaw 24 also has a workpiece-gripping body 35 integral with a bottom support member 36 which lies within the channel of the elongate body 29 and which has a screw-threaded bore through which the screw 33 extends. The gripping body 35 has a grooved configuration 37 along and adjacent its upper edge and also rear strengthening ribs 38.

The elongate body 29 has intermediate its ends a depending formation 39 (see FIG. 6) which may be provided by pressing out the metal of the body 29. The purpose of this projection will be described later.

It will be manifest that rotation of the screw 33 causes the gripping body 35 to move towards or away from the leading end of the elongate body 29 depending on the direction of rotation.

The movable jaw 24 may be wholly or partly formed of plastics material.

Reference will now be made to the worktop 20 (see in particular FIGS. 5 to 8).

Figures 6, 7, 8:
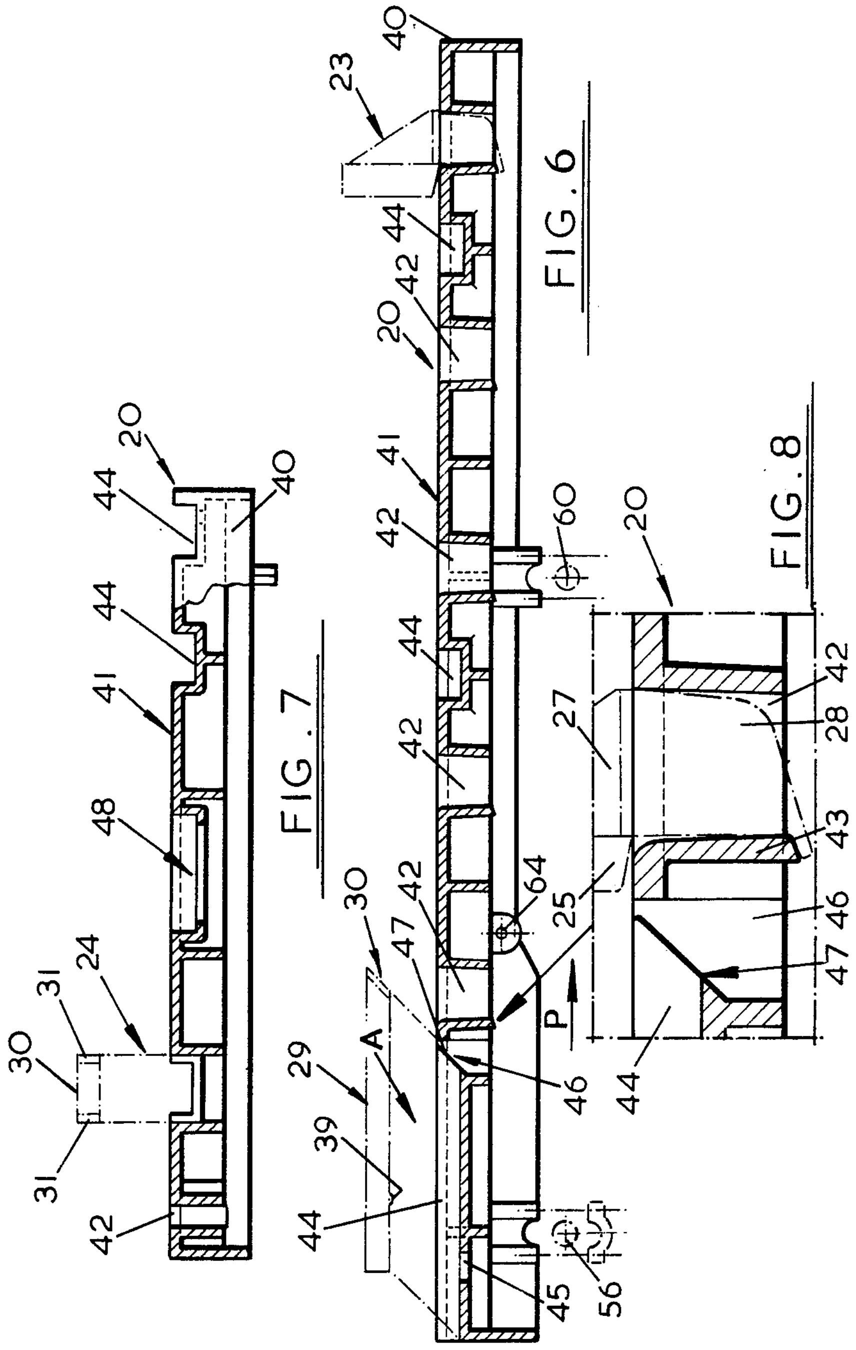
FIG. 6 is a sectional view on the line VI—VI of FIG. 5.
FIG. 7 is a sectional view on the line VII—VII of FIG. 5.
FIG. 8 is a sectional view to an enlarged scale of a detail of FIG. 6.

The worktop 20 is moulded from plastics material, for example of polypropylene, with a peripheral lip 40 depending from its upper surface 41 and has an underside of ribbed configuration as is generally indicated at 42 (see FIG. 6).

The worktop 20 is moulded with a multiplicity of through-apertures 42 in the form of slots laid out in a predetermined arrangement and each of which is adapted to receive a hook-like formation 28 of a fixed jaw 23 to locate the latter on the worktop 20. The spacing between certain of these slots 42 is such as to accommodate the laterally-spaced hook-like formations 28A of a double fixed jaw 23A (see for example slots 42A).

The ribbed configuration of the worktop 20 and the complementary shape of the hook-like formation 28 (or 28A) is such (see FIG. 8) that pressure of a workpiece (not shown) against the gripping body 25 resulting from the action of a movable jaw 24 on the workpiece tends to push the fixed jaw 23 in the direction of the arrow P and so urge the formation 28 against and under the rear rib configuration 43 defining one wall of the slot 42 in question.

It will be manifest that insertion and removal or repositioning of a fixed jaw 23 (single or double) can be easily and quickly effected.

The worktop 20 is also formed with a number of elongate recesses 44 extending inwardly from the peripheral edge of the worktop 20 and as with the slots 42 laid out in a predetermined arrangement. Eachof these recesses 44 is configured to accommodate an elongate body 29 of a movable jaw 24. Each recess 44 intermediate its ends is apertured as indicated at 45 to receive the depending projection 39 of the elongate body 29 of a movable jaw 24. Each recess 44 at its leading (i.e. inboard) end terminates in an elongate transverse slot 46 having a rear downwardly inclined wall 47 against which the front wall 30 and lateral extensions 31 of the elongate body 29 of a movable jaw 24 abut. The movable jaw 24 is slid into a recess 44 at an angle (see arrow A, FIG. 6) and pushed rearwardly (i.e. outboard) until the projection 39 engages in the aperture 45. This engagement resists longitudinal movement of the elongate body 29 relative to the worktop 20 when a movable jaw 24 is being operated.

A through-aperture 48 of rectangular configuration and of relatively substantial dimensions is formed adjacent one end of the workshop 20 and serves to receive and mount and serve as a working area for a tool such for example as an electrical drill or a power saw.

Recesses 44 and associated slots 46 are infilled, when not in use, by blanking-off pieces 49 which are dimensionally identical to the elongate bodies 29 although they are solid and not of channelled configuration.

Similarly, rectangular aperture 48 which may be disposed in either of the two ways shown in FIG. 1 is filled-in, when not in use, by a blanking-off member 50 (shown inverted in FIG. 1).

Along and adjacent the edge of the worktop 20 remote from the aperture 48 is a recess 51 which mounts a rule 52, preferably a steel rule.

Instead of a fixed vice jaw 23 a movable jaw 24 may be employed with a simple stop having a hook-like formation similar to 28 for engaging in a slot 44.

It will be manifest from the above that the separate and independent fixed and movable vice jaws 23 (23A) and 24 are operatively tied together in working relationship through the worktop 20.

It will also be manifest that as a result of the worktop 20 of the present invention the transverse and/or longitudinal spacing between fixed and movable vice jaws 23 (23A) and 24 can be widely varied. For example, considering FIG. 5, there could be a movable jaw at position MJI and a single fixed jaw at position FJI or FJ2 or FJ3; or two movable jaws at positions MJI and MJ2 and a double fixed jaw at positions FJI, FJIA or FJ3, FJ3A; or a movable jaw at each of positions MJI, MJ4 and fixed jaws at FJI, FJ4, and so on.

With the fixed and movable vice jaws 23(23A) and 24 removed and the blanking-off pieces 49 and blanking-off member 50 fitted onto the worktop 20 the latter is perfectly flat and imperforate save for the slots 42. A flat imperforate cover (not shown) may be fitted on top of the worktop 20 when in this condition to provide a conventional table surface. Moreover it is envisaged that a table extension may be provided which can be secured at one end, in any convenient manner, to one end of the worktop, when the latter is converted to a conventional table, which extension is supported at its other end on a pivotal metal leg frame and which has a reversible table top, one side smooth and the other indented or recessed to hold bottles and other containers.

Reverting now to the workbench and in particular FIGS. 1 to 4, the worktop 20 is supported, as aforesaid, by the collapsible leg arrangement 21.

The leg arrangement 21 comprises a pair of rear metal legs 53, splayed outwardly at the bottom as indicated at 54, joined by a metal step or foot rest 55, and pivoted to the underside of the worktop 20 at locations 56 (see FIG. 6).

The leg arrangement also comprises a pair of front metal legs 57 also splayed outwardly at the bottom as indicated at 58, joined by a metal strip or bar 59 and pivoted to the underside of the worktop at 60 (see FIG. 6).

The legs 43, 57 at each side of the worktop 20 are pivotally connected by a strut 61, which struts ensure simultaneous pivoting movements of the pairs of legs 53, 57.

The pivotal connection 62 between each strut 61 and its corresponding leg 53 is also the pivotal connection between the leg 53 and one end of a collapsible or foldable crank stay 63, the other end of the latter being pivoted to the underside or the worktop 20 at 64. A knob or handle 65 is provided on each crank stay 63 to facilitate manipulation thereof and a stop 66 resists excessive. pivotal movement of the crank stays 62 in the direction of workbench erection.

A shelf 67 of moulded plastics material, for example polypropylene, lies under the worktop 20 parallel thereto. At its front end it is suspended from the worktop 20 by rods or spring wires 68 pivoted to the worktop 20 at locations 60 and sprung into holes or recesses in the shelf. At its rear end, it is pivotally secured to the legs 53 by pivotal connections 62 (see detail view of FIG. 1).

A saw block 69 with lateral extensions 70 is integral with the shelf 67 and lies, in erected position of the workbench, rearwardly of the legs 53.

It can readily be seen (FIG. 4) that in folding or collapsing of the workbench upon breaking of the crank stays 62, the legs 57 and 53 pivot forwardly and upwardly about connections 60 and 56 towards the underside of the worktop 20 carrying the shelf/saw block assembly 22 upwards to lie against the underside of the worktop 20.

The workbench is consequently of very compact, relatively flat and easily carried configuration when collapsed or folded.

It is envisaged that wheel extensions may be pivoted to the bottom of the legs 53 and 57 so that, when these are brought into use, the erected workbench can be wheeled to different locations.

It is envisaged that with each workbench there is provided at least one single fixed vice jaw, one double fixed vice jaw and two movable vice jaws.

What is claimed is:

1. A workbench comprising:

a worktop of unitary construction formed with parallel rows of spaced elongate locating apertures and at least one elongate recess extending inboard from an edge of the worktop, the recess having its long axis parallel with a locating aperture row and terminating in an elongate slot normal to the recess, the slot being defined by a wall downwardly inclined towards the worktop edge and presenting spaced lateral faces and a vice comprising a fixed vice jaw having a depending flat hook-like formation adapted to engage in a selected locating aperture non-rotatably to position the fixed vice jaw on the worktop and a movable vice jaw separate from the fixed vice jaw comprising an elongate body adapted to be located in a selected elongate recess aligned with a locating aperture selected to receive the fixed vice jaw and having two ends, the elongate body having a depending formation at one end which engages in the elongate slot of the elongate recess and which has lateral inclined extensions which bear against the spaced lateral faces of the slot wall;

a screw arrangement rotatably supported by the elongate body; and a gripping jaw proper slidably supported on the elongate body and coupled to the screw arrangement whereby rotation of the latter causes the sliding movement of the gripping jaw proper.

2. The workbench of claim 1, wherein the worktop is of rectangular configuration and is formed with parallel rows of spaced elongate locating apertures extending in both the longitudinal and transverse directions.

3. The workbench of claim 2, wherein the worktop has at least one elongate recess extending inboard from at least two adjacent edges, each recess spaced from and having its long axis parallel with a row of elongate locating apertures.

4. The workbench of claim 1, wherein each elongate locating aperture is in the form of a slot traversing the worktop, the flat hook-like formation of the fixed vice jaw, when fitted into a selected slot, engaging the underside of the worktop.

5. The workbench of claim 1, further comprising a blanking-off element adapted to be received in an elongate recess when the recess is vacant, the blanking-off element lying flush with the upper surface of the worktop.

6. The workbench of claim 1, further comprising a second recess extending along and adjacent to one edge of the worktop to accommodate a rule.

7. The workbench of claim 1, further comprising a collapsible leg arrangement for support.

8. The workbench of claim 7, further comprising a shelf having two ends and having an integral saw block connected to one end, the shelf pivotally suspended beneath the worktop and pivotally connected to the leg arrangement.

* * * * *